United States Patent
Hart et al.

(10) Patent No.: US 9,414,333 B2
(45) Date of Patent: Aug. 9, 2016

(54) SYSTEM AND METHOD FOR DOWNLINK AND UPLINK PARAMETER INFORMATION TRANSMISSION IN A MULTI-HOP WIRELESS COMMUNICATION SYSTEM

(75) Inventors: Michael John Beems Hart, London (GB); Yuefeng Zhou, Oxshott (GB); Dorin Viorel, Calgary (CA); Chenxi Zhu, Gaithersburg, MD (US); Michiharu Nakamura, Kawasaki (JP); Masahiro Watanabe, Kawasaki (JP); Hiroshi Fujita, Kawasaki (JP); Makoto Yoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1554 days.

(21) Appl. No.: 12/513,805

(22) PCT Filed: Jul. 31, 2007

(86) PCT No.: PCT/GB2007/002891
§ 371 (c)(1), (2), (4) Date: Nov. 19, 2009

(87) PCT Pub. No.: WO2008/056095
PCT Pub. Date: May 15, 2008

(65) Prior Publication Data
US 2010/0074164 A1 Mar. 25, 2010

(30) Foreign Application Priority Data
Nov. 6, 2006 (GB) .................................. 0622120.4

(51) Int. Cl.
*H04W 52/46* (2009.01)
*H04L 1/16* (2006.01)
*H04L 1/00* (2006.01)

(52) U.S. Cl.
CPC ............. *H04W 52/46* (2013.01); *H04L 1/0028* (2013.01); *H04L 1/0029* (2013.01); *H04L 1/0003* (2013.01); *H04L 1/0009* (2013.01); *H04L 2001/0097* (2013.01)

(58) Field of Classification Search
CPC .. H04L 1/0029; H04B 7/155; H04B 7/15507; H04W 84/047

USPC ................................ 370/315, 326, 330; 455/7
See application file for complete search history.

(56) References Cited

U.S. PATENT DOCUMENTS

| 4,261,054 A | 4/1981 | Scharla-Nielsen |
| 5,029,164 A | 7/1991 | Goldstein |

(Continued)

FOREIGN PATENT DOCUMENTS

| CA | 2556681 A1 | 9/2005 |
| CN | 1547862 A | 11/2004 |

(Continued)

OTHER PUBLICATIONS

Non-Final Office Action dated Dec. 10, 2012 received in U.S. Appl. No. 12/226,344.

(Continued)

Primary Examiner — Scott M Sciacca
(74) Attorney, Agent, or Firm — Smith, Gambrell & Russell, LLP (57) ABSTRACT

A method for transmission of information about downlink and uplink parameters of a intermediate apparatus link in a multi-hop wireless communication system, the system comprising a first node apparatus, a second node apparatus and one or more intermediate apparatuses, each said apparatus being operable to transmit and receive information along a series of links forming a communication path for downlink and uplink communication, the communication path extending between the first node and second node apparatuses via the or each intermediate apparatus, each link comprising either a first node link between the first node apparatus and a said intermediate apparatus or an intermediate apparatus link between a said intermediate apparatus and a said apparatus which is not the first node apparatus, and the system having access to a minimum allocation unit for allocating time and transmission frequency bandwidth, the method comprising: obtaining values of downlink and uplink parameters for a particular intermediate apparatus link; mapping both values onto a single minimum allocation unit and transmitting them towards the first node apparatus.

24 Claims, 6 Drawing Sheets

CQI signalling requirements in a two-hop network

(56) References Cited

U.S. PATENT DOCUMENTS

| | | | |
|---|---|---|---|
| 5,293,639 A | 3/1994 | Wilson | |
| 5,592,154 A | 1/1997 | Lin | |
| 5,724,659 A | 3/1998 | Daniel | |
| 6,002,690 A | 12/1999 | Takayama | |
| 6,678,248 B1 | 1/2004 | Haddock | |
| 6,870,890 B1* | 3/2005 | Yellin et al. | 375/340 |
| 6,907,212 B2 | 6/2005 | Harada | |
| 7,184,703 B1 | 2/2007 | Naden | |
| 7,376,122 B2 | 5/2008 | Draves, Jr. | |
| 7,400,856 B2 | 7/2008 | Sartori | |
| 7,454,244 B2 | 11/2008 | Kassab | |
| 7,483,493 B2 | 1/2009 | Bar-Ness et al. | |
| 7,574,230 B1 | 8/2009 | Oh | |
| 7,609,631 B2 | 10/2009 | Stanwood | |
| 7,738,859 B2 | 6/2010 | Roy | |
| 7,865,146 B2 | 1/2011 | Hart | |
| 7,881,741 B2 | 2/2011 | Horiuchi | |
| 7,983,151 B2 | 7/2011 | Hart | |
| 8,000,651 B2 | 8/2011 | Horiuchi | |
| 2001/0008520 A1 | 7/2001 | Tiedemann, Jr. et al. | |
| 2002/0039383 A1 | 4/2002 | Zhu | |
| 2002/0115409 A1 | 8/2002 | Khayrallah | |
| 2002/0115440 A1 | 8/2002 | Hamabe | |
| 2003/0097460 A1 | 5/2003 | Higashiyama | |
| 2003/0123401 A1 | 7/2003 | Dean | |
| 2003/0125067 A1 | 7/2003 | Takeda | |
| 2003/0156554 A1 | 8/2003 | Dillinger | |
| 2003/0165127 A1 | 9/2003 | Fujiwara | |
| 2003/0198204 A1 | 10/2003 | Taneja | |
| 2003/0202476 A1 | 10/2003 | Billhartz | |
| 2004/0001464 A1 | 1/2004 | Adkins | |
| 2004/0123229 A1 | 6/2004 | Kim | |
| 2004/0192204 A1* | 9/2004 | Periyalwar et al. | 455/25 |
| 2004/0213144 A1* | 10/2004 | Murakami et al. | 370/208 |
| 2004/0219876 A1 | 11/2004 | Baker | |
| 2004/0233918 A1* | 11/2004 | Larsson et al. | 370/400 |
| 2004/0266339 A1 | 12/2004 | Larsson | |
| 2005/0014464 A1 | 1/2005 | Larsson | |
| 2005/0048914 A1 | 3/2005 | Sartori | |
| 2005/0048983 A1 | 3/2005 | Abraham | |
| 2005/0063356 A1 | 3/2005 | Larsen | |
| 2005/0068970 A1* | 3/2005 | Srikrishna et al. | 370/400 |
| 2005/0201295 A1* | 9/2005 | Kim et al. | 370/241 |
| 2005/0207367 A1* | 9/2005 | Onggosanusi et al. | 370/315 |
| 2005/0213587 A1 | 9/2005 | Cho | |
| 2005/0249162 A1 | 11/2005 | Kim | |
| 2005/0249164 A1 | 11/2005 | Kwak | |
| 2005/0272366 A1 | 12/2005 | Eichinger | |
| 2005/0288020 A1 | 12/2005 | Cho | |
| 2006/0040697 A1 | 2/2006 | Komatsu | |
| 2006/0067243 A1 | 3/2006 | Bejerano | |
| 2006/0209671 A1 | 9/2006 | Khan | |
| 2006/0227796 A1 | 10/2006 | Wei | |
| 2006/0230238 A1* | 10/2006 | Roy et al. | 711/141 |
| 2006/0264172 A1 | 11/2006 | Izumikawa | |
| 2006/0270341 A1* | 11/2006 | Kim et al. | 455/16 |
| 2007/0050495 A1 | 3/2007 | Sridhar et al. | |
| 2007/0066239 A1 | 3/2007 | Hart | |
| 2007/0066240 A1 | 3/2007 | Hart | |
| 2007/0066241 A1 | 3/2007 | Hart | |
| 2007/0066337 A1 | 3/2007 | Hart | |
| 2007/0081507 A1 | 4/2007 | Koo | |
| 2007/0116106 A1 | 5/2007 | Hart | |
| 2008/0009243 A1 | 1/2008 | Hart | |
| 2008/0043707 A1* | 2/2008 | Ren et al. | 370/348 |
| 2008/0049718 A1 | 2/2008 | Chindapol | |
| 2008/0125109 A1* | 5/2008 | Larsson et al. | 455/424 |
| 2008/0165720 A1 | 7/2008 | Hu | |
| 2008/0225774 A1 | 9/2008 | Kim | |
| 2009/0175178 A1* | 7/2009 | Yoon et al. | 370/252 |
| 2009/0185479 A1 | 7/2009 | Hart | |
| 2010/0110973 A1 | 5/2010 | Hart | |
| 2010/0111027 A1 | 5/2010 | Hart | |

FOREIGN PATENT DOCUMENTS

| | | |
|---|---|---|
| CN | 1859364 A | 11/2006 |
| EP | 1388936 A2 | 2/2004 |
| EP | 1753188 A1 | 2/2007 |
| EP | 1761080 A1 | 3/2007 |
| EP | 1773091 A2 | 4/2007 |
| EP | 1801995 | 6/2007 |
| GB | 2440982 | 8/2006 |
| GB | 2440984 | 8/2006 |
| GB | 2440985 | 8/2006 |
| GB | 2443465 | 11/2006 |
| GB | 2443466 | 11/2006 |
| JP | 3166831 A | 7/1991 |
| JP | 6505371 | 8/1992 |
| JP | 2002185382 A | 6/2002 |
| JP | 2003124876 A | 4/2003 |
| JP | 2003258719 A | 9/2003 |
| JP | 2004032393 A | 1/2004 |
| JP | 2004173123 A | 6/2004 |
| JP | 2005033625 A | 2/2005 |
| JP | 2005142676 A | 6/2005 |
| JP | 2005142968 A | 6/2005 |
| JP | 2005159900 A | 6/2005 |
| KR | 1020030049031 A | 6/2003 |
| WO | 9214309 A1 | 8/1992 |
| WO | 9746038 A2 | 12/1997 |
| WO | 98936509 A1 | 8/1998 |
| WO | 0077948 | 12/2000 |
| WO | 0150635 A1 | 7/2001 |
| WO | 0163849 A2 | 8/2001 |
| WO | 03044970 A2 | 5/2003 |
| WO | 2004107693 | 12/2004 |
| WO | 2004107693 A1 | 12/2004 |
| WO | 2004112282 A1 | 12/2004 |
| WO | 2005013507 A1 | 2/2005 |
| WO | 2005020517 A1 | 3/2005 |
| WO | 2005025110 A3 | 3/2005 |
| WO | 2005053338 A1 | 6/2005 |
| WO | 2005064872 A1 | 7/2005 |
| WO | 2005088914 A1 | 9/2005 |
| WO | 2006020032 A1 | 2/2006 |
| WO | 2006080507 A1 | 8/2006 |
| WO | 2006099024 | 9/2006 |
| WO | 2006099024 A2 | 9/2006 |
| WO | 2006101013 A1 | 9/2006 |
| WO | 2006130964 A1 | 12/2006 |
| WO | 2007003142 A1 | 1/2007 |
| WO | 2007019672 A1 | 2/2007 |
| WO | 2007028252 A2 | 3/2007 |

OTHER PUBLICATIONS

Final Office Action dated Dec. 14, 2012 received in U.S. Appl. No. 11/453,055.

Notification of Reason(s) for Refusal dated Dec. 18, 2012 received in Japanese Patent Application No. 2011-191107.

Non-Final Office Action dated Jan. 10, 2013 received in U.S. Appl. No. 12/613,342.

Notice of Allowance dated Jan. 16, 2013 received in U.S. Appl. No. 11/454,028.

Non-Final Office Action dated Oct. 3, 2012 received in U.S. Appl. No. 13/168,500.

Final Office Action dated Jun. 26, 2012 received in U.S. Appl. No. 12/226,344.

Office Action dated Jul. 5, 2011 received in corresponding Japanese Patent Application No. 2009-091471.

Japanese Office Action dated Feb. 1, 2011 received in corresponding Japanese Patent Application 2006167985.

Japanese Office Action dated May 10, 2011 received in corresponding Japanese Patent Application 2006167983.

Final Office Action dated Oct. 14, 2011 received in U.S. Appl. No. 12/226,319.

Final Office Action dated Oct. 25, 2011 received in U.S. Appl. No. 12/226,344.

Non-Final Office Action dated Oct. 31, 2011 received in U.S. Appl. No. 12/301,414.

(56) References Cited

OTHER PUBLICATIONS

Notice of Allowance dated Nov. 7, 2011 received in U.S. Appl. No. 11/453,839.
Notification of Reason for Refusal dated Sep. 6, 2011 received in corresponding Japanese Patent Application 2006167986.
Notice of Allowance dated Nov. 23, 2011 received in U.S. Appl. No. 12/973,086.
European Search Report dated Feb. 2, 2011 received in corresponding EP06252979.7.
Japanese Office Action dated Mar. 12, 2013 received in Patent Appeal No. 2012-516.
European Office Action issued Jan. 17, 2011 in application 07 766 391.2-2415.
Non-Final Office Action dated Jan. 9, 2013 received in U.S. Appl. No. 12/613,367.
Non-Final Office Action dated Jan. 9, 2013 received U.S. Appl. No. 11/454,016.
Notice of Allowance dated Dec. 22, 2011 received in U.S. Appl. No. 11/453,839.
Non-Final Office Action dated Jan. 12, 2012 received in U.S. Appl. No. 12/613,367.
Notice of Allowance dated Jan. 19, 2012 received in U.S. Appl. No. 11/454,028.
Non-Final Office Action dated Jan. 26, 2012 received in U.S. Appl. No. 12/226,319.
Non-Final Office Action dated Feb. 7, 2012 received in U.S. Appl. No. 12/613,342.
Non-Final Office Action dated Feb. 13, 2012 received in U.S. Appl. No. 12/226,344.
Notice of Allowance dated Mar. 8, 2012 received in U.S. Appl. No. 12/301,414.
Zhang Jingmei et al: "Adaptive optimal transmit power allocation for two-hop non-regenerative wireless relaying system" Vehicular Technology Conference, 2004. VTC 2004-Spring. 2004 IEEE 59th Milan, Italy May 17-19, 2004, Piscataway, NJ, USA, IEEE US, May 17, 2004, pp. 1213-1217, XP010766105 ISBN: 0-7803-8255-2.
British Search Report for Application No. GB0622120.4 dated Dec. 6, 2006.
International Search Report dated Oct. 25, 2007.
IEEE STD 802.11g-2003 IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band IEEE Computer Society, Jun. 27, 2003.
IEEE STD 802.16/2004 IEEE Standard for Local and metropolitan area networks Part 16: Air Interface for Fixed Broadband Wireless Access Systems IEEE Computer Society and the IEEE Microwave Theory and Techniques Society, Oct. 1, 2004.
Non-Final Office Action dated Jul. 16, 2009 received in U.S. Appl. No. 11/453,055.
Apostolopoulos, J.G. et. Al. " Source-Channel Diversity for Parallel Channels" IEEE Transactions on Information Theory, IEEE Service Center, Piscataway, NJ, US, vol. 51, No. 10, Oct. 2005, pp. 3518-3539, XP011139661.
Communication dated Sep. 30, 2008 forwarding Extended European Search Report in European Application No. 08151572.8-1246 with copy of abstract and narrative.
European Search Report; EP 0525 3768 dated Oct. 14, 2005.
European Search Report: EP 05253784 dated Oct. 17, 2005.
European Search Report: EP 0525 3767 dated Oct. 17, 2005.
European Search Report; EP 05253785 dated Oct. 19, 2005.
European Search Report; EP 05253766 dated Oct. 13, 2005.
Advisory Action dated Jul. 2, 2010 received in U.S. Appl. No. 11/453,055.
IEEE St. 802.16e 2005 "IEEE Standard for Local and Metropolitan Area Networks. Part 16: Air Interface for Fixed and Mobile Broadband Wireless Access Systems. Amendment 2: Physical and Medium Access Control Layers for Combined Fixed and Mobile Operation in Licensed Bands." Dated Feb. 28, 2006.
First Notice of Office Action in corresponding 200610095607.8 dated Feb. 6, 2009.
IEEE 802.11 a/g standard: "Wireless LAN Medium Access Control (MAC) and Physical Layer (PHY) specifications" Amendment 4; Further Higher Data Rate Extension in the 2.4 Ghz Band dated Jun. 27, 2003.
Non-Final Office Action dated Jun. 16, 2010 received in U.S. Appl. No. 12/613,367.
Non-Final Office Action dated Aug. 23, 2010 rec'd in U.S. Appl. No. 12/613,342.
Final Office Action dated Mar. 9, 2011 received in U.S. Appl. No. 12/613,342.
Non-Final Office Action dated Nov. 29, 2010 received in U.S. Appl. No. 11/453,055.
International Search Report for PCT/GB2007/002902(Dec. 14, 2007).
Sreng V. et al.: Relayer selection strategies in cellular networks with peer-to-peer relaying, Vehicular Technology Conference, 2003. 2003 IEEE 58th Orlando, FL., USA Oct. 6-9, 2003, Piscataway, NJ, USA, IEEE, US, Oct. 6, 2003, pp. 1949-1953.
Final Office Action dated Mar. 24, 2010 received in U.S. Appl. No. 11/453,055.
First Notification of Office Action dated Apr. 3, 2009 received in corresponding Chinese Application No. 200610172053.7.
Non-Final Office Action dated Apr. 9, 2009 received in U.S. Appl. No. 11/454,016.
Mona Ghassemian, Vasilis Friderikos, Hamid Aghvami; Hybrid Handover in Multihop Radio Access Networks; Sep. 2005; document number: XP-010855829.
Non-Final Office Action dated Jan. 5, 2010 received in U.S. Appl. No. 11/637,025.
Final Office Action dated Jul. 6, 2010 received in U.S. Appl. No. 11/637,025.
Final Office Action dated Jun. 16, 2010 received in U.S. Appl. No. 11/453,844.
Non-Final Office Action dated Sep. 30, 2009 received in U.S. Appl. No. 11/453,844.
Notice of Allowance dated Oct. 22, 2010 received on U.S. Appl. No. 11/453,844.
Extended European Search Report dated Feb. 8, 2011 received in 09173072.1-1246/2144466.
Extended European Search Report dated Feb. 14, 2011 received in 09173073.9-1246/2144472.
Extended European Search Report dated Feb. 14, 2011 received in 09173074.7-1246/2144473.
Notice of Allowance dated Jan. 13, 2011 received in U.S. Appl. No. 11/453,839.
Final Office Action dated Dec. 15, 2009 received in U.S. Appl. No. 11/454,016.
Non-Final Office Action dated Jun. 8, 2010 received in U.S. Appl. No. 11/453,839.
Non-Final Office Action dated Dec. 9, 2010 received in U.S. Appl. No. 11/454,016.
Final Office Action dated Jan. 25, 2011 received in U.S. Appl. No. 12/613,367.
Non-Final Office Action dated Jun. 30, 2010 received in U.S. Appl. No. 11/454,028.
Non-Final Office Action dated Apr. 10, 2009 received in U.S. Appl. No. 11/454,028.
Final Office Action dated Dec. 15, 2009 received in U.S. Appl. No. 11/454,028.
Final Office Action dated Dec. 28, 2010 received in U.S. Appl. No. 11/454,028.
Advisory Action dated Apr. 29, 2010 received in U.S. Appl. No. 11/454,028.
Non-Final Office Action dated Dec. 1, 2009 received in U.S. Appl. No. 11/453,045.
Non-Final Office Action dated Jan. 6, 2011 received in U.S. Appl. No. 11/453,045.
Final Office Action dated Aug. 2, 2010 received in U.S. Appl. No. 11/453,045.

(56) References Cited

OTHER PUBLICATIONS

Final Office Action dated May 2, 2011 received in U.S. Appl. No. 11/453,016.
European Search Report dated Oct. 18, 2005 received in EP05253783.
Notice of Allowance dated Apr. 26, 2011 received in U.S. Appl. No. 11/453,839.
Final Office Action date May 17, 2011 received in U.S. Appl. No. 11/453,055.
Japanese Office Action dated Mar. 21, 2012 received in JP2009-530924.
Notification of Reasons for Refusal dated Apr. 24, 2012 received in JP2006-167986.
Final Notification for Reasons for Refusal dated Feb. 14, 2012 received in JP2009-535780.
Modification for Enabling RS Operations dated Nov. 2005 by Tzu-Ming Lin, Chang-Lung Hsiao, Rodger Tseng and Wem-Ho Sheen ITRI Computer and Communications Research Labs, Tawain, R.O.C.
Notice of Allowance received in U.S. Appl. No. 11/454,028 dated May 24, 2012.
Japanese Office Action dated May 29, 2012 received in Japanese Patent Application No. JP2011-081524.
Christian Hoymann et al. "Multihop Communication in Relay Enhanced IEEE 802.16 Networks" Personal, Indoor and Mobile Radio Communications, 2006 IEEE 17th International Symposium on, IEEE, PI Sep. 11, 2006, pp. 1-4, XP002462917 the whole document.
Daehyon Kim, et al. "Fair and efficient multihop scheduling algorithm for IEEE 802.16 BWA systems" Broadband Networks, 2005 2nd International Conference onMA Oct. 3-7, 2005, Piscataway, NJ, USA, IEEE pp. 895-901 the whole document.
Extended European Search Report dated Mar. 1, 2010 received in corresponding European Patent No. 09172393.2-2416/2141870.
International Search Report issued in PCT/GB2007/002909 dated Mar. 2, 2007.
Kaneko S. et al, "Proposed Relay Method with P-MP Structure of IEEE 802.16/2004" Personal, Indoor and Mobile Radio Communications, 2005. PIMRC 2005, IEEE 16th International Symposium on Berlin, Germany Sep. 11-14, 2005, Piscataway, NJ, USA, IEEE, pp. 1606-1610, XP010926479 Paragraph [0011]-paragraph [00IV].
Non-Final Office Action dated Mar. 21, 2011 received in U.S. Appl. No. 12/226,344.
Search Report Issued in Priority United Kingdom application No. 0704093.4 dated Jul. 3, 2007.
United Kingdom Search Report dated Apr. 19, 2007 for application No. GB0705225.1.
United Kingdom Search Report dated May 23, 2007 for application No. GB0705225.1.
Non-Final Office Action dated Jun. 22, 2011 received in U.S. Appl. No. 11/637,025.
Non-Final Office Action dated Jun. 16, 2011 received in U.S. Appl. No. 11/454,028.
Final Office Action dated Jun. 23, 2011 received in U.S. Appl. No. 11/453,045.
Non-Final Office Action dated Jun. 27, 2011 received in U.S. Appl. No. 12/226,319.
Non-Final Office Action dated May 20, 2011 received in U.S. Appl. No. 12/973,086.
Notice of Allowance dated May 23, 2011 received in U.S. Appl. No. 11/453,839.
Japanese Office Action dated May 10, 2011 received in JP2006-167982.
Japanese Office Action dated May 31, 2011 received in JP2006167981.
Japanese Office Action dated May 24, 2011 received in JP2006342666.
Notice of Allowance dated Jul. 28, 2011 received in U.S. Appl. No. 11/453,839.
Japanese Office Action date May 10, 2011 received in JP2006-167984.
Japanese Office Action dated Jun. 14, 2011 received in JP2009-535780.
Japanese Office Action dated Jun. 28, 2011 received in JP2009-091469.
Chinese Office Action dated Aug. 12, 2011 received in 200780033647.2.
Final Office Action dated Sep. 29, 2011 received in U.S. Appl. No. 11/454,016.
Notice of Allowance dated Sep. 28, 2011 received in U.S. Appl. No. 12/973,086.
Non-Final Office Action dated Jul. 10, 2012 received in U.S. Appl. No. 12/226,319.
Non-Final Office Action dated Nov. 20, 2012 received in U.S. Appl. No. 12/226,319.
Decision of Refusal dated Oct. 11, 2011 received in Japanese Patent Application No. 2006-167982.
Decision of Refusal dated Oct. 11, 2011 received in Japanese Patent Application No. 2006-167984.
Non-Final Office Action dated Aug. 2, 2012 received in U.S. Appl. No. 11/453,055.
Final Office Action dated Aug. 14, 2012 received in U.S. Appl. No. 12/613,342.
Final Office Action dated Aug. 23, 2012 received in U.S. Appl. No. 12/613,367.
Notice of Allowance dated Aug. 16, 2013 received in U.S. Appl. No. 12/613,367.
3rd Notification of Chinese Office Action dated Jul. 15, 2013 received in Application No. 200910167069.2.
Notice of Allowance dated Nov. 6, 2013 received in U.S. Appl. No. 12/226,319.
Non-final Office Action dated Oct. 31, 2013 received in U.S. Appl. No. 13/168,500.
Non-final Office Action dated Jul. 19, 2013 received in U.S. Appl. No. 11/453,055.
Non-final Office Action dated Jul. 24, 2013 received in U.S. Appl. No. 12/226,319.
Notice of Allowance dated Aug. 5, 2013 received in U.S. Appl. No. 12/613,342.
Non-final Office Action dated Apr. 22, 2013 received in U.S. Appl. No. 12/226,319.
Final Office Action dated Jun. 26, 2013 received in U.S. Appl. No. 12/226,344.
Notice of Allowance dated Jun. 21, 2013 received in U.S. Appl. No. 11/454,028.
Final Office Action dated Jul. 9, 2013 received in U.S. Appl. No. 13/168,500.
Notice of Allowance dated Oct. 16, 2013 received in U.S. Appl. No. 12/226,344.
Final Office Action dated Oct. 1, 2013 received in U.S. Appl. No. 11/454,016.
Notice of Allowance dated Apr. 9, 2014 received in U.S. Appl. No. 11/454,016.
Final Office Action dated Mar. 31, 2014 received in U.S. Appl. No. 11/453,055.

* cited by examiner

Fig.1

CQI signalling requirements in a two-hop network

Example TDD frame structure from OFDMA physical layer of the IEEE802.16 standard

SYSTEM AND METHOD FOR DOWNLINK AND UPLINK PARAMETER INFORMATION TRANSMISSION IN A MULTI-HOP WIRELESS COMMUNICATION SYSTEM Currently there exists significant interest in the use of multihop techniques in packet based radio and other communication systems, where it is purported that such techniques will enable both extension in coverage range and increase in system capacity (throughout).

Figure 3:
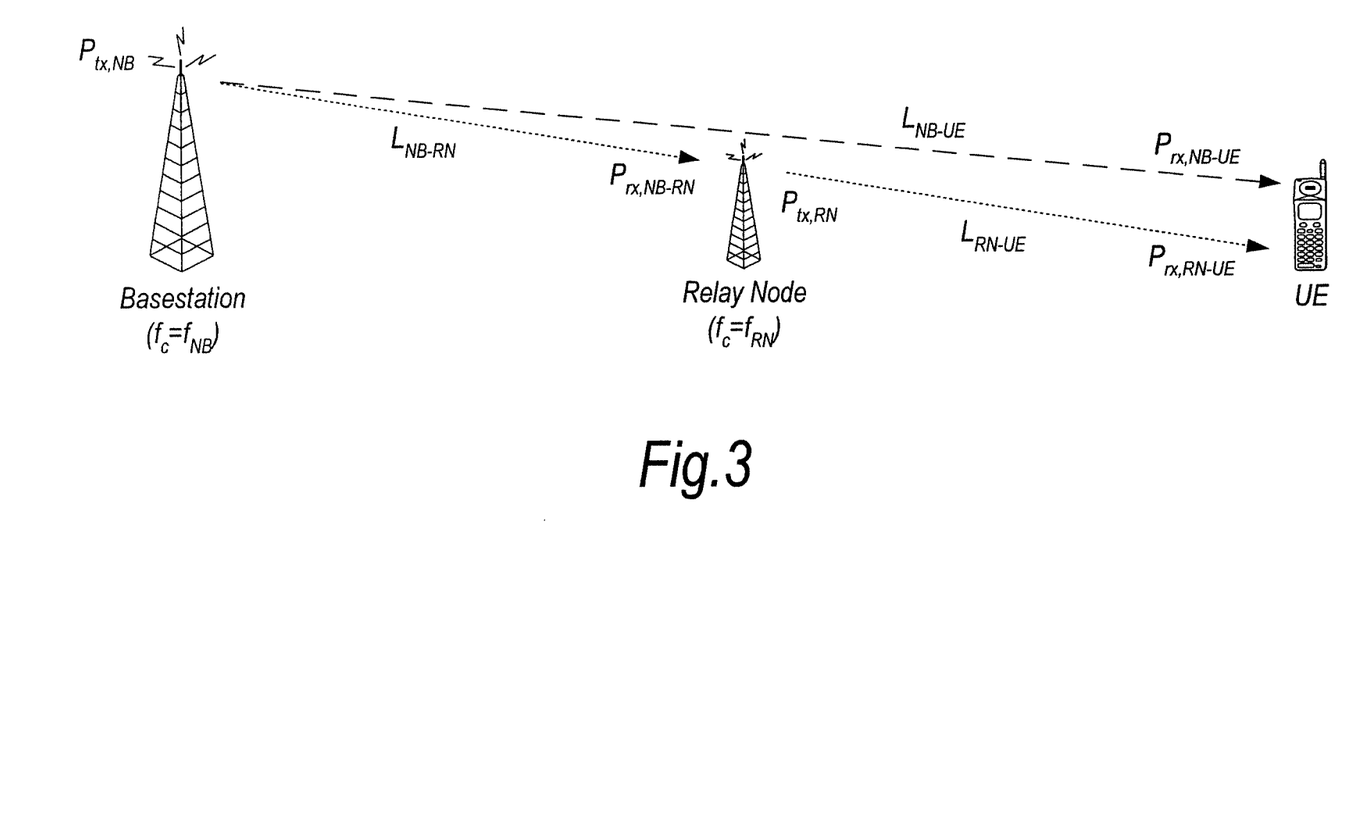
FIG. 3 shows a single-cell two-hop system.

In a multi-hop communication system, communication signals are sent in a communication direction along a communication path (C) from a source apparatus to a destination apparatus via one or more intermediate apparatuses. FIG. 3 illustrates a single-cell two-hop wireless communication system comprising a base station BS (known in the context of 3G communication systems as "node-B" NB) a relay node RN (also known as a relay station RS) and a user equipment UE (also known as mobile station MS). In the case where signals are being transmitted on the downlink (DL) from a base station to a destination user equipment (UE) via the relay node (RN), the base station comprises the source station (S) and the user equipment comprises the destination station (D). In the case where communication signals are being transmitted on the uplink (UL) from a user equipment (UE), via the relay node, to the base station, the user equipment comprises the source station and the base station comprises the destination station. The relay node is an example of an intermediate apparatus (I) and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

Figure 4A:
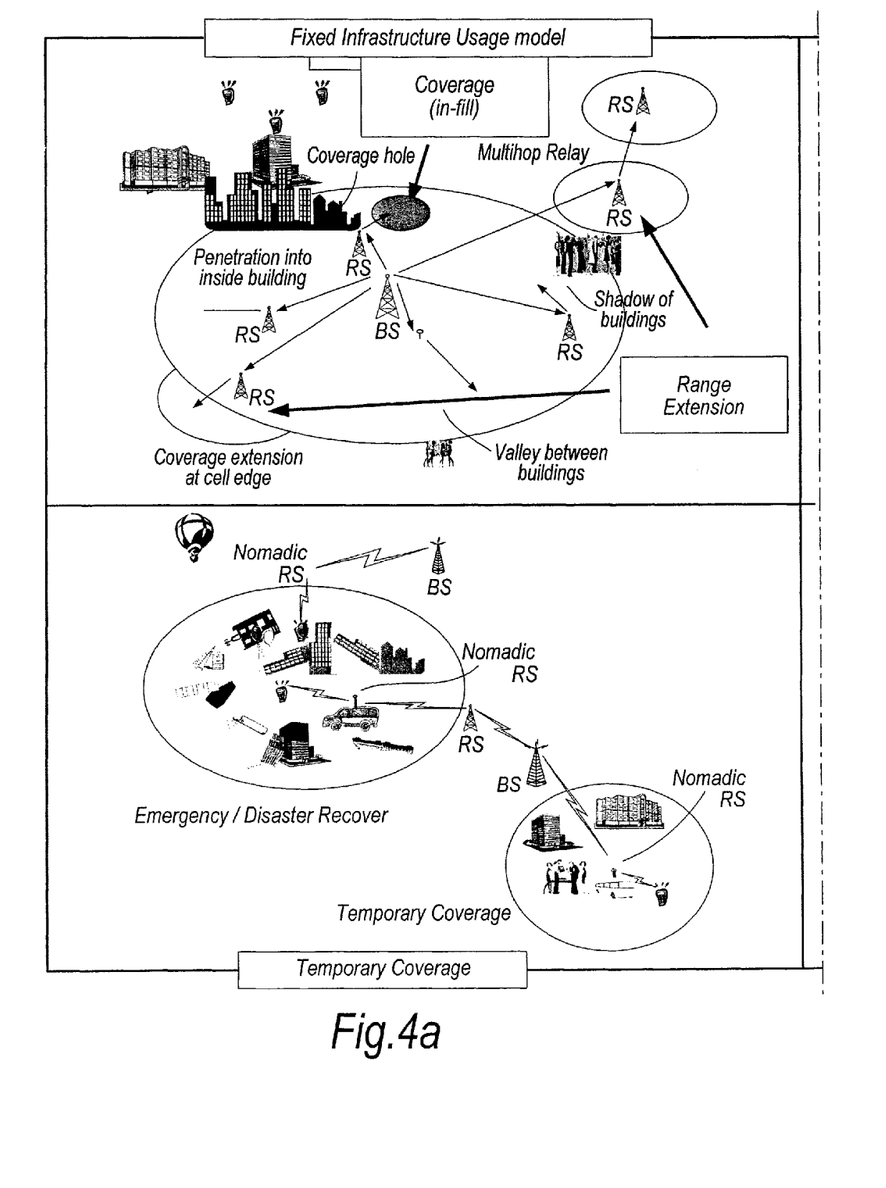
FIG. 4 shows applications for relay stations.
Figure 4B:
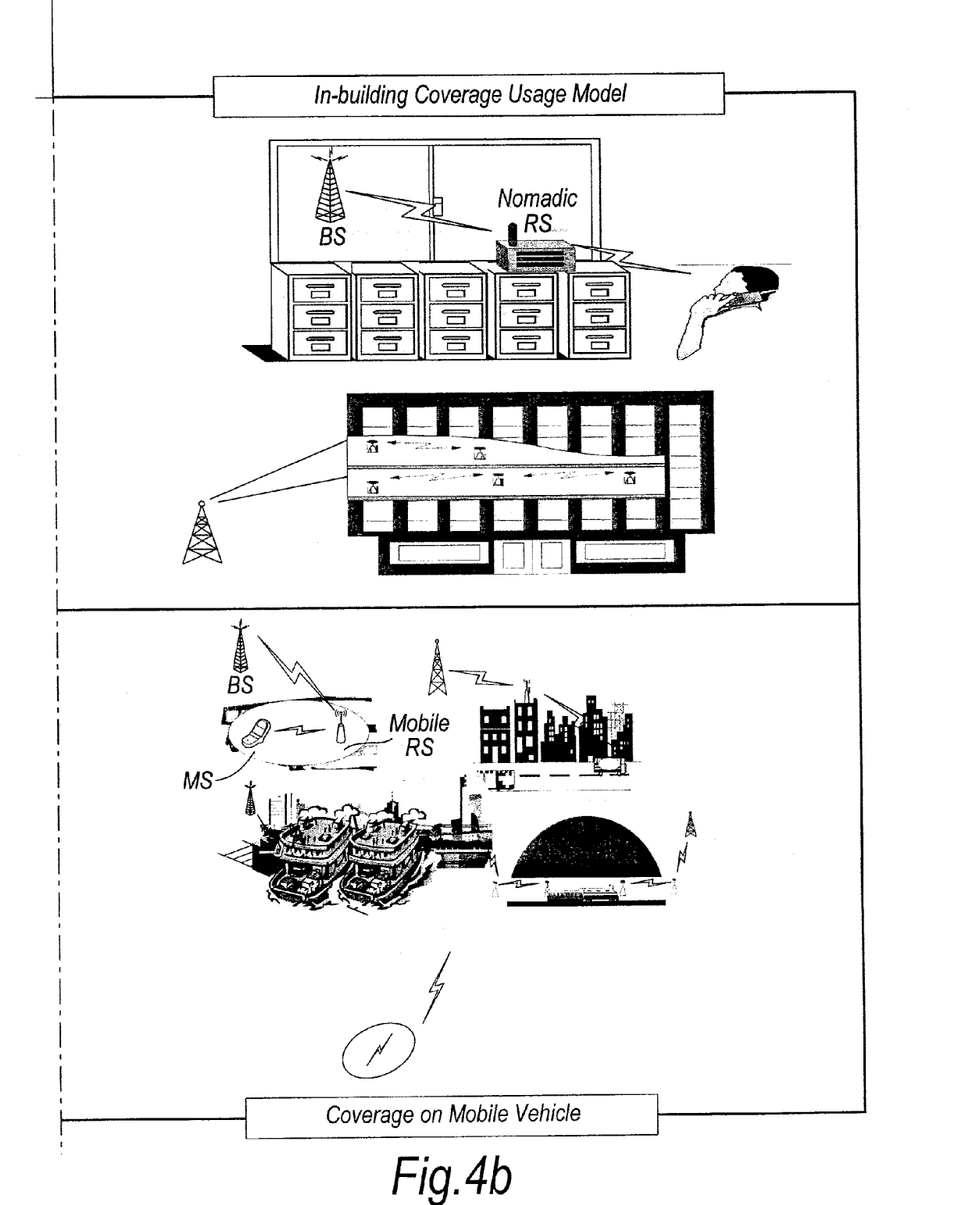

FIG. 4 illustrates a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIG. 4 is positioning of a nomadic relay station to allow penetration of coverage within a building that could be above, at, or below ground level.

Other applications are nomadic relay stations which are brought into effect for temporary cover, providing access during events or emergencies/disasters. A final application shown in the bottom right of FIG. 4 provides access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modelled by:

$$L = b + 10n \log d \quad (A)$$

Where d (meters) is the transmitter-receiver separation, b(db) and n are the pathloss parameters and the absolute pathloss is given by $l=10^{(L/10)}$.

The sum of the absolute path losses experienced over the indirect link SI+ID may be less than the pathloss experienced over the direct link SD. In other words it is possible for:

$$L(SI) + L(ID) < L(SD) \quad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via an intermediate apparatus (e.g. relay node), rather than being sent directly from the source apparatus to the destination apparatus. If implemented appropriately, multi-hop communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multi-hop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE802.11a/g standard), and in wireless MAN applications such as WiMAX (based on the IEEE 802.16 standard).

OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both sub-carriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta ft}, 0 \leq t \leq T_s \quad (1)$$

where $\Delta f$ is the sub-carrier separation in Hz, $T_s=1/\Delta f$ is symbol time interval in seconds, and $c_n$ are the modulated source signals. The sub-carrier vector in (1) onto which each of the source signals is modulated $c \in C_n$, $c=(c_0, c_1 \ldots c_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm. OFDMA (Orthogonal Frequency Division Multiple Access) is a multiple access variant of OFDM. It works by assigning a subset of sub-carriers, to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or download and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE802.16 standard incorporates both an FDD and TDD mode.

Figure 5:
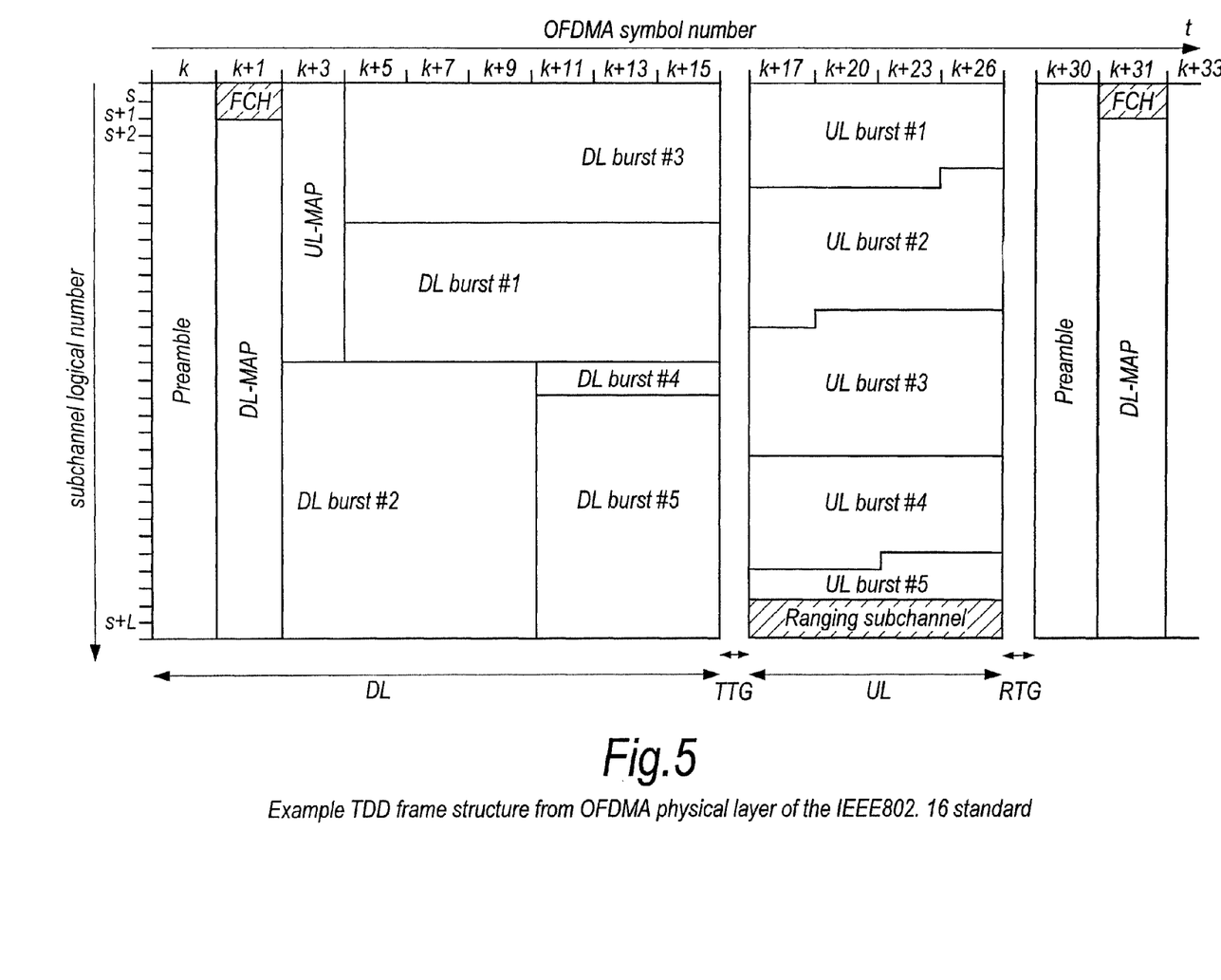
FIG. 5 shows an example TDD frame structure from OFDMA physical layer of the IEEE802.16 standard.

As an example, FIG. 5 illustrates the single hop TDD frame structure used in the OFDMA physical layer mode of the IEEE802.16 standard (WiMAX).

Each frame is divided into DL and UL subframes, each being a discrete transmission interval. They are separated by Transmit/Receive and Receive/Transmit Transition Guard interval (TTG and RTG respectively). Each DL subframe starts with a preamble followed by the Frame Control Header (FCH), the DL-MAP, and the UL-MAP.

The FCH contains the DL Frame Prefix (DLFP) to specify the burst profile and the length of the DL-MAP. The DLFP is a data structure transmitted at the beginning of each frame and contains information regarding the current frame; it is mapped to the FCH.

Simultaneous DL allocations can be broadcast, multicast and unicast and they can also include an allocation for another BS rather than a serving BS. Simultaneous ULs can be data allocations and ranging or bandwidth requests.

Particularly when a relay is controlled in a centralised manner (i.e. not locally) in order to facilitate fast adaptation of the transmitting modem to the channel environment (i.e. adaptation of the modulation & coding, MIMO operation, closed loop power control), it is typically required for the receiver to provide indicators of link quality such as measurement information (CQI) of the receive signal quality and other parameters. The transmitter can then adapt to the current situations.

Figure 1:
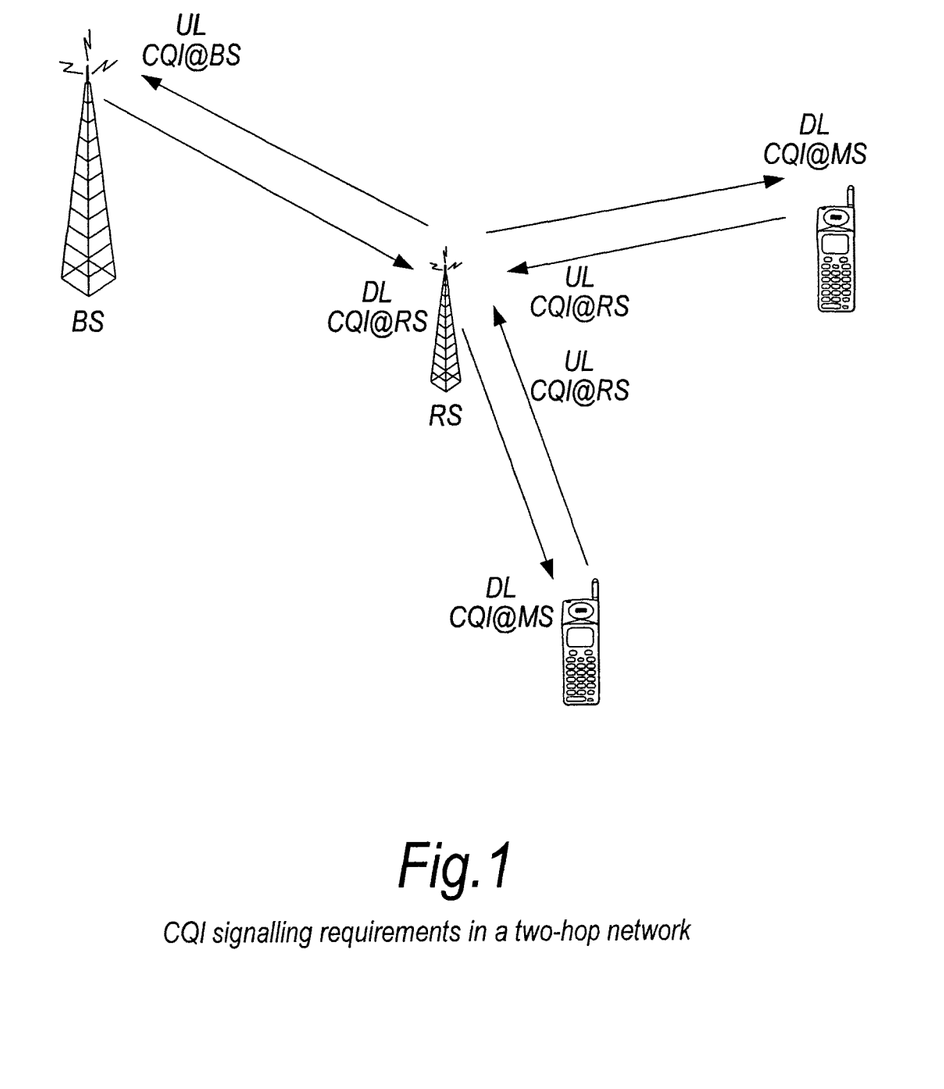
FIG. 1 shows CQI signalling requirements in a two-hop network.

However, the problem is that, as described for example in EP 05257911.7, the signalling bandwidth required can be significantly increased due to the extra links that exist and the fact that all this information has to be conveyed back to the BS (or controlling entity in the general sense). The contents of EP 05257911.7 relating to transmission of link parameters is incorporated herein by way of reference and a copy of this application is filed herewith. To assist in appreciation of the problem, the requirements in the case of a simple 2 hop scenario are illustrated in FIG. 1.

The invention is defined in the independent claims, to which reference should now be made. Advantageous embodiments are set out in the sub claims.

Preferred features of the present invention will now be described, purely by way of example, with reference to the accompanying drawings, in which.

For more detail as to frame format, the reader is referred to two further patent applications filed on the same date, by the same applicant, with agent reference numbers P107330GB00 and P107297GB00, as well as earlier applications GB 0616477.6, GB 0616481.8 and GB 0616479.2; each of these describing interrelated inventions proposed by the applicant. The contents of each of these applications are incorporated herein by way of reference and copies of them are filed herewith.

Whereas in a single hop network all that would be required is the reporting of the CQI on the DL at the receiver to the BS, it now needs the reporting of the CQI on the DL at the RS, as well as a pair of CQI values for each MS connected to the RS. As in the 802.16 standard, the content of which is incorporated herein by reference, each 4-bit or 6-bit CQI value is mapped separately on to 1 slot (i.e. 48 subcarriers) (note this is a half slot=24 subcarriers for a 3-bit value) using QPSK modulation, this mechanism is inefficient for conveying such large amount of information across a link that might typically be more robust than in the single hop case. Embodiments of the invention therefore provide a very simple signalling solution that reduces the required signalling overhead in the two hop case to a similar level as required in a single hop case by packing the CQI pair on the access links into one channel.

Figure 2:
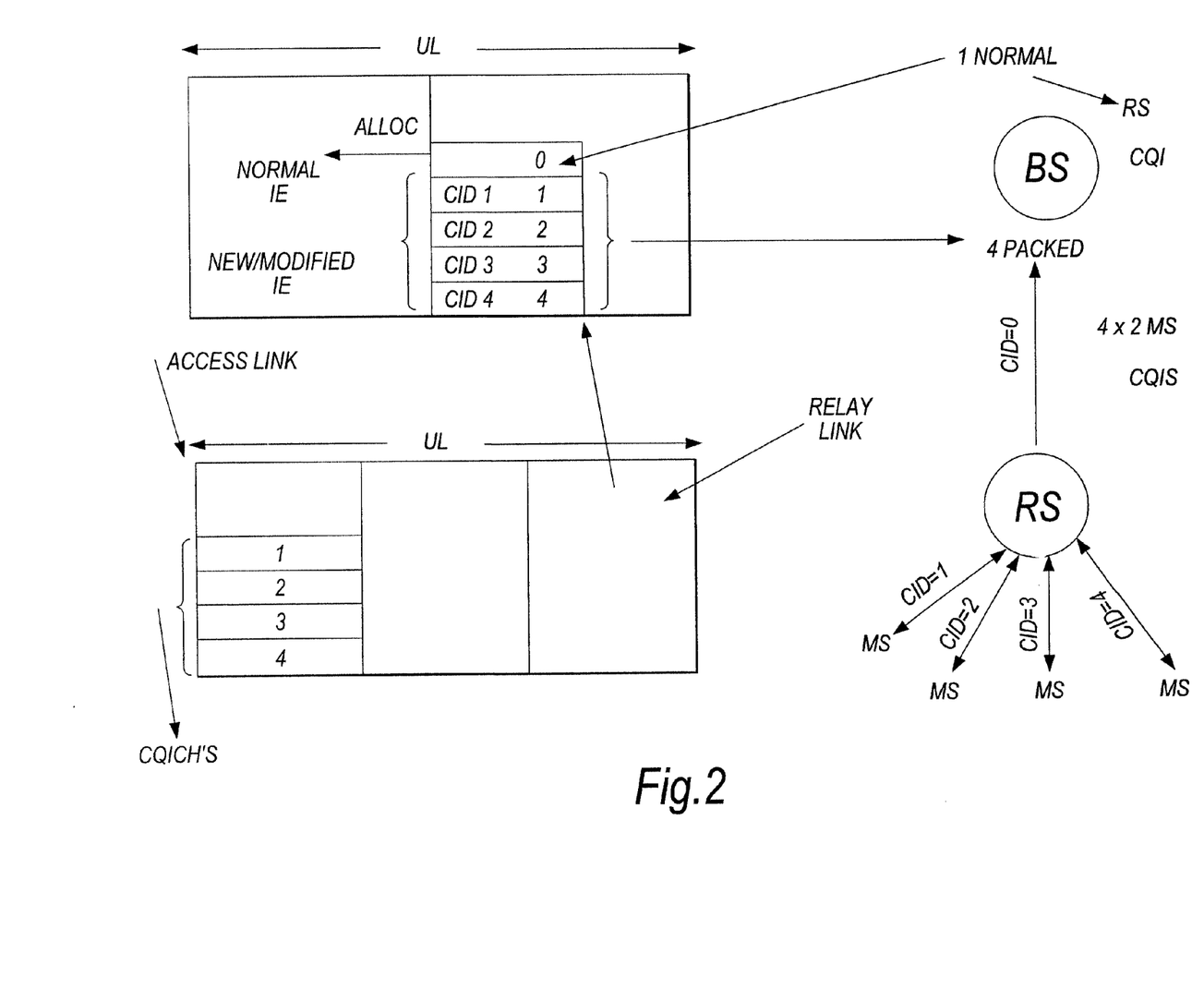
FIG. 2 shows the CQICH allocation in uplink subframes.

FIG. 2 demonstrates how the connection IDs are mapped onto QCI channels (CQICHs). In the access link, (from the subscribers to the relay station) 4 CQICHs are used. In the relay link, 5 are required, the additional CQICH for the CQI value between the base station and relay station in the downlink direction. This last value need not be packed.

Embodiments of the invention have two parts. The first is a way of packing CQI values into a CQI channel to reduce overhead. The second part is a new method for CQI channel allocation from the BS for the new links.

CQI Reporting

Currently the CQI value is mapped to the CQI channel using a simple vector mapping approach rather than the normal FEC applied to data. The reason for using such an approach is the decoding time can be much quicker than that required when performing full FEC based decoding and hence allows the receiver to gain access to the transmitted information much quicker and hence prepare to act on it in a timely manner.

This proposal maintains the essence of a robust yet simple to decode modulation process of the CQI value on to the 24 (3-bit CQI) or 48 (4-bit, 6-bit CQI) subcarriers. Instead of using a vector based approach, the two CQI values are simply packed consecutively and then CDMA modulated onto the subcarriers by applying a spreading sequence of appropriate spreading factor. In the case of a pair of 3-bit or 6-bit values the spreading code has a spreading factor of 8 and in the case of a pair of 4-bit values it is 12. Numerous well-known code types can be applied such as Walsh-Hadamard, Gold codes, Kasami sequences or PN codes.

The receiver then simply demodulates the CQI value by applying despreading of the 96-bit sequence to get the two CQI values. Consequently, it is possible to convey two CQI values to the BS using the same resource as that required for conveying one value. Whilst the robustness of transmission will obviously be lowered, the combination of QPSK modulation with CDMA modulation of SF=8 combined with the underlying permutation sequence used to map the logical to physical subcarriers should retain a significant degree of coding gain.

CQI Channel Allocation

CQI channel allocation currently sends a message on a certain connection to indicate to the receiver the CQI channel ID to use for reporting, and how often/when it can use this channel. In the case illustrated in FIG. 1, it is possible for the BS to allocate a CQI channel to both the RS and MSs to get them to report their downlink CQI measurement to the BS and RS respectively. However, a new mechanism is required to get the RS to transmit the packed CQI pair available at the RS for each RS-MS link to the BS.

In order to do this a new message is sent by the BS to the RS on the RS connection (using its ID) to request transmission of a packed CQICH pair. This message includes the MS CID and CQICH ID that should be used for this packed CQI pair. Both the BS and RS maintain tables that mapped CQICH IDs to MS CIDs so that when the BS receives a CQICH transmission from the RS on a certain channel it knows to expect that it is a packed pair of CQI values from the RS. It is then possible for the BS to support packed CQI pairs from RSs as well as RSs' own CQI report values in the same fast-feedback region that is used for reporting, amongst other values, CQI measurements on CQI channels.

The alternative approach to maintaining tables that map channels to CQICH IDs that are consistent between the BS and RS is to use different CDMA codes to indicate the ID of the MS from which the packed reports originated. This gives the RS the freedom to manage the reporting of the pairs on any CQI channel, as the BS can use the unique code to determine to which MS the report relates.

SUMMARY OF BENEFITS

The key benefits are:
Enables overhead associated with reporting CQI values in a centrally controlled relaying system to be significantly reduced (halved).
The logical subcarrier modulation mechanism of using a spreading code combined with the underlying OFDMA subcarrier permutation provides a simple mechanism for robustly encoding the packed CQI values (note an alternative would be to modify the existing vector mapping approach).
Does not require the RS to possess complex FEC decoding or encoding hardware (i.e. technique can easily be applied in a low-cost amplify and forward relay, as well as in a full featured relay).
Due to low complexity decoding being available, means the RS can potentially relaying the information in the UL within the same subframe when a frame structure similar to that in P107297GB00 is utilised.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

The invention claimed is:

1. A method for transmission of information about downlink and uplink parameters of an intermediate apparatus link in a multi-hop wireless communication system, the system comprising a base station apparatus, a user terminal apparatus and one or more intermediate apparatuses, each said apparatus being operable to transmit and receive information along a series of links forming a communication path for downlink and uplink communication, the communication path extending between the base station and user terminal apparatuses via the one or more intermediate apparatuses, and including a base station link between the base station apparatus and one of the intermediate apparatuses and an intermediate apparatus link between one of the intermediate apparatuses and an apparatus which is not the base station apparatus, and the system having access to a minimum allocation unit for allocating time and transmission frequency bandwidth, the method comprising:

obtaining values of downlink and uplink parameters for the intermediate apparatus link, the downlink parameter being for transmission along the intermediate apparatus link towards the user terminal and the uplink parameter being for transmission along the same intermediate apparatus link towards the base station; and mapping both values onto a single minimum allocation unit and transmitting them towards the base station apparatus, wherein the system is an OFDM or OFDMA system and both values are mapped onto a single slot.

2. The method according to claim 1, wherein the downlink and uplink parameters are indicators of channel quality.

3. The method according to claim 1, wherein the downlink and uplink parameters are indicators as to transmission receipt.

4. The method according to claim 1, wherein the intermediate apparatus link is between an intermediate apparatus and the next apparatus in the downlink direction along the communication path, the method further comprising, in order to obtain the downlink and uplink values, the next apparatus transmitting the downlink value to the intermediate apparatus and the intermediate apparatus determining the uplink value.

5. The method according to claim 1, wherein the values are encoded before transmission, using an encoding scheme with a fast decoding process.

6. The method according to claim 5, wherein the encoded values are mapped onto the transmission frequency bandwidth using a modulation scheme before transmission.

7. The method according to claim 1, wherein prior to obtaining the values, an apparatus transmits a request for the values, said request including an indication of the intermediate apparatus link.

8. The method according to claim 7, wherein the request also includes an indication of the transmission frequency bandwidth and time assigned for transmission of the values in a time-frequency format for use in assigning available transmission frequency bandwidth during a discrete transmission interval.

9. The transmission method according to claim 8, wherein the time-frequency format is a format for a downlink or uplink sub-frame in a time-division-duplex communication system.

10. The method according to claim 7, wherein the indication is in the form of an ID for the next apparatus.

11. The method according to claim 7, wherein an apparatus ID is fixedly mapped to an allocation of transmission time and transmission frequency bandwidth in a time-frequency format for use in assigning available transmission frequency bandwidth during a discrete transmission interval.

12. The method according to claim 7, wherein an apparatus ID is variably mapped to an allocation of transmission time and transmission frequency bandwidth in a time-frequency format for use in assigning available transmission frequency bandwidth during a discrete transmission interval and different spreading codes are used to distinguish between different said apparatuses.

13. The method according to claim 1, wherein the one or more intermediate apparatuses are relay stations.

14. The transmission method according to claim 1, wherein said system is an OFDM or OFDMA system, and wherein the minimum allocation unit is a slot of an OFDM or OFDMA downlink or uplink sub-frame of an OFDM or OFDMA frame.

15. The method according to claim 1, wherein the system is an OFDM or OFDMA system and the values are packed consecutively.

16. The method according to claim 1, wherein the system is an OFDM or OFDMA system and the values are mapped to the subcarriers in the slot using a spreading mechanism such that the number of subcarriers used to convey the value after application of the spreading mechanism is equal to the number of subcarriers in one slot.

17. The method according to claim 1, wherein the system is an OFDM or OFDMA system and the values are CDMA encoded using a spreading sequence.

18. The method according to claim 1, wherein the system is an OFDM or OFDMA system and the values are mapped onto subcarriers using a look-up table approach.

19. The method according to claim 1, wherein the system is an OFDM or OFDMA system and the values are modulated onto physical subcarriers using QPSK modulation.

20. The method according to claim 1, wherein the system is an OFDM or OFDMA system and the parameter is CQI, the method packing two CQI values into a CQI channel.

21. A multi-hop wireless communication system, the system comprising a base station apparatus, a user terminal apparatus and one or more intermediate apparatuses, each said apparatus being operable to transmit and receive information along a series of links forming a communication path for downlink and uplink communication, the communication path extending between the base station and the user terminal apparatuses via the one or more intermediate apparatuses, and including a base station link between the base station apparatus and one of the intermediate apparatuses and an intermediate apparatus link between one of the intermediate apparatuses and an apparatus which is not the base station apparatus, the system having access to a minimum allocation unit for allocating time and transmission frequency bandwidth, the system being arranged to obtain values of downlink and uplink parameters for the intermediate apparatus link, the downlink parameter being for transmission along the intermediate apparatus link towards the user terminal and the uplink parameter being for transmission along the same intermediate apparatus link towards the base station; and to map both values onto a single minimum allocation unit, wherein the system is an OFDM or OFDMA system and both values are mapped onto a single slot; and the system further comprising a transmitter for transmitting the values towards the base station apparatus.

22. An intermediate apparatus in a multi-hop wireless communication system, the system comprising a base station apparatus, a user terminal apparatus and one or more such intermediate apparatuses, each said apparatus being operable to transmit and receive information along a series of links forming a communication path for downlink and uplink communications, the communication path extending between the base station and the user terminal apparatuses via the one or more intermediate apparatuses, and including a base station link between the base station apparatus and one of the intermediate apparatuses and an intermediate apparatus link between one of the intermediate apparatus and an apparatus which is not the base station apparatus;

the intermediate apparatus including a transmitter and a receiver and having access to a minimum allocation unit for allocating time and transmission frequency bandwidth and, the intermediate apparatus being arranged to:

obtain values of downlink and uplink parameters for the intermediate apparatus link, the downlink parameter being for transmission along the intermediate apparatus link towards the user terminal and the uplink parameter being for transmission along the same intermediate apparatus link towards the base station; and to map both values onto a single minimum allocation unit, wherein the system is an OFDM or OFDMA system and both values are mapped onto a single slot, and wherein the transmitter is for transmitting the values towards the base station apparatus.

23. A non-transitory computer-readable storage medium storing a computer program which, when executed on a computing device of a multi-hop wireless communication system, causes the system to carry out a method, the system comprising a base station apparatus, a user terminal apparatus and one or more intermediate apparatuses, each said apparatus being operable to transmit and receive information along a series of links forming a communication path for downlink and uplink communications, the communication path extending between the base station and the user terminal apparatuses via the one or more intermediate apparatuses, and including a base station link between the base station apparatus and one of the intermediate apparatuses and an intermediate apparatus link between one of the intermediate apparatuses and an apparatus which is not the base station apparatus, and the system having access to a minimum allocation unit for allocating time and transmission frequency bandwidth, the method comprising:

obtaining values of downlink and uplink parameters for the intermediate apparatus link, the downlink parameter being for transmission along the intermediate apparatus link towards the user terminal and the uplink parameter being for transmission along the same intermediate apparatus link towards the base station; and     mapping both values onto a single minimum allocation unit, wherein the system is an OFDM or OFDMA system and both values are mapped onto a single slot; and transmitting them towards the base station apparatus.

24. A non-transitory computer-readable storage medium storing a computer program which, when executed on a computing device in an intermediate apparatus of a multi-hop wireless communication system, causes the intermediate apparatus to carry out a method, the system comprising a base station apparatus, a user terminal apparatus and one or more intermediate apparatuses, each said apparatus being operable to transmit and receive information along a series of links forming a communication path for downlink and uplink communications, the communication path extending between the base station and the user terminal apparatuses via the one or more intermediate apparatuses, and including a base station link between the base station apparatus and one of the intermediate apparatuses and an intermediate apparatus link between one of the intermediate apparatuses and an apparatus which is not the base station apparatus, and the intermediate apparatus having access to a minimum allocation unit for allocating time and transmission frequency bandwidth, the method comprising:

obtaining values of downlink and uplink parameters for the intermediate apparatus link, the downlink parameter being for transmission along the intermediate apparatus link towards the user terminal and the uplink parameter being for transmission along the same intermediate apparatus link towards the base station; and     mapping both values onto a single minimum allocation unit, wherein the system is an OFDM or OFDMA system and both values are mapped onto a single slot; and transmitting them towards the base station apparatus.

\* \* \* \* \*